United States Patent Office 2,862,970
Patented Dec. 2, 1958

2,862,970

PHENOLIC BIS(TRIPHENYLPHOSPHONIUM HALIDES) AND PROCESSES

Lawrence E. Thielen, Chicago, Ill., assignor to G. D. Searle & Co., Chicago, Ill., a corporation of Illinois No Drawing. Application September 9, 1955
Serial No. 533,529

5 Claims. (Cl. 260—606.5)

This invention relates to phenolic bis(triphenylphosphonium halides) and processes for the manufacture thereof. More particularly, this invention relates to compounds of the formula $(C_6H_5)_3P^+—Z—P^+(C_6H_5)_3 \ \ 2X^-$ wherein Z is a hydroxyarylene radical selected from the group consisting of

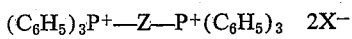

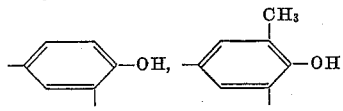

and

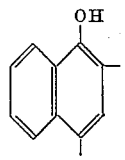

radicals, and X is bromine or chlorine.

The claimed compositions are useful because of their valuable pharmacological properties. Thus, for example, the subject compounds are anticholinergic agents. In particular, they are characterized by the capacity for blocking transmission of nerve impulses across the autonomic ganglia. Additionally, the compounds of this invention manifest significant pressor-depressor activity, producing divers blood pressure changes presumably traceable to tonic effects on the cardioregulatory and vasomotor systems of the animal body. Finally, one of the substances of the present disclosure—namely, phenol-2,4-bis(triphenylphosphonium bromide)—is an antibacterial agent, being active in vitro against Bacillus subtilis.

The compounds to which this invention relates are soluble in water, as also in aqueous solutions of alcohols and other water-miscible organic solvents. They may be administered in solid form as tablets or capsules; dissolved in aqueous media they may be given parenterally.

The bromo compounds of the present discovery may be prepared by reacting triphenylphosphine with an appropriate dibromophenol—for example, 2,4-dibromo-1-naphthol—using a preferably high-boiling, inert, polar, organic solvent—for example, a glycol ether such as diethylene glycol diethyl ether, or a ketonic solvent such as 2,4-pentanedione—as the reaction medium. Other solvents suitable to the purpose are 2-butanone and chloroform. The reaction is ordinarily carried out at temperatures in the range from 150° to 225° C. over periods of time amounting to as much as 3 days, a sealed vessel being used to contain the reagents when the selected operating temperatures require working under pressure. The hereinafter claimed chlorides are derived by subjecting corresponding bromides to the action of silver chloride, the reactants being brought together in aqueous media at the boiling point.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. Analyses of samples of materials prepared in accordance with the procedures hereinafter detailed were found to confirm the identities assigned in each instance.

EXAMPLE 1

*Phenol - 2,4 - bis(triphenylphosphonium bromide)*.—A mixture of 50 parts of triphenylphosphine, 24 parts of 2,4-dibromophenol, and 68 parts of diethylene glycol diethyl ether is heated at reflux temperatures under an atmosphere of nitrogen for 72 hours. Addition of ether to the cooled mixture precipitates an oil which is recovered by decantation of the superior ether layer. The residue is extracted with a mixture of water and ether, whereupon the aqueous phase is separated and distilled in vacuo at approximately 90° C. The residual oil is next taken up in chloroform, and the chloroform solution is then treated with decolorizing charcoal and filtered. Chromatography on silica gel using chloroform and ethyl alcohol as developing solvents yields a purified product which is again treated with decolorizing charcoal in chloroform solution, following which solvent is removed at 90° C. under nitrogen. Trituration of the residue with acetone affords a white powder which melts at 184–188° C. The phenol-2,4-bis(triphenylphosphonium bromide) thus obtained has the formula

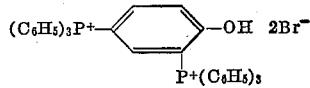

EXAMPLE 2

*Phenol - 2,4-bis(triphenylphosphonium chloride)*.—To 30 parts of the bisbromide of the preceding Example 1 in 3000 parts of water at the boiling point is added, with vigorous agitation, 11 parts of silver chloride. The reactants are maintained for 2 hours at reflux temperatures with continued agitation, so producing phenol-2,4-bis(triphenylphosphonium chloride), of the formula

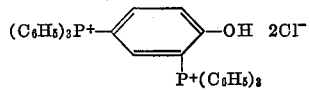

EXAMPLE 3

*2 - methylphenol - 4,6 - bis(triphenylphosphonium bromide)*.—To 50 parts of 2,4-dibromo-6-methylphenol in 136 parts of diethylene glycol diethyl ether is added 100 parts of triphenylphosphine. The reactants are heated under a nitrogen atmosphere for 72 hours at the boiling point, following which they are cooled and poured into a large volume of anhydrous ether, precipitating an oil. Ether is decanted and the residual oil extracted with water in the presence of additional ether. Water is removed from the aqueous layer by evaporation in vacuo at approximately 90° C., following which the residue is taken up in ethyl alcohol and this solution treated with decolorizing charcoal. The solution is then filtered and finally stripped of solvent at 90° C. in a nitrogen atmosphere. Trituration of the oily residue with anhydrous ether affords a white powder which is too hygroscopic to permit significant melting point determinations. The product is 2-methylphenol-4,6-bis(triphenylphosphonium bromide), of the formula

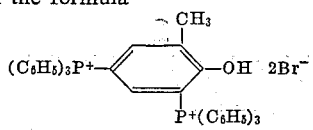

EXAMPLE 4

*1-naphthol-2,4-bis(triphenylphosphonium bromide).*—A mixture of 100 parts of triphenylphosphine, 58 parts of 2,4-dibromo-1-naphthol, and 136 parts of diethylene glycol diethyl ether is heated at reflux temperatures in an atmosphere of nitrogen for 72 hours. The reaction mixture is then cooled and combined with anhydrous ether, precipitating an oil. Ether is decanted and the residue extracted with water, ether being added to facilitate the extraction. The aqueous phase is filtered, following which water is removed at 90° C. under vacuum. The residue is dissolved in an equi-volume mixture of acetone and absolute alcohol, whereupon this solution is treated with decolorizing charcoal and filtered. The filtrate is stripped of solvent at 90° C. in an atmosphere of nitrogen. Trituration of the residue with anhydrous ether, and subsequently with anhydrous ether containing a little acetone, affords a white powder which melts in the range 200–205° C. The product thus obtained is 1-naphthol-2,4-bis(triphenylphosphonium bromide) having the formula

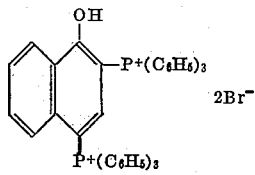

What is claimed is:

1. A compound of the formula $R_3P^+$—Z—$P^+R_3$  $2X^-$ wherein R is a phenyl radical; Z is a hydroxyarylene radical selected from the group consisting of

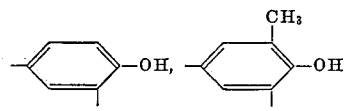

and

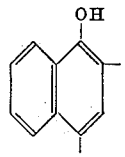

radicals; and X is a member of the group consisting of bromine and chlorine.

2. Phenol-2,4-bis(triphenylphosphonium bromide).
3. Phenol-2,4-bis(triphenylphosphonium chloride).
4. 2-methylphenol-4,6-bis(triphenylphosphonium bromide).
5. 1-naphthol-2,4-bis(triphenylphosphonium bromide).

References Cited in the file of this patent

Ginzel et al.: Chem. Abs. 47 col. 4496 *c–f*; Chem. Abs. 48 col. 8951 *e–h*.